Inventor
Alois Moosmann

Aug. 11, 1959 A. MOOSMANN 2,899,031
PNEUMATIC GEAR-SHIFT ARRANGEMENTS FOR TOOTHED WHEEL
CHANGE-SPEED GEARS, ESPECIALLY FOR MACHINE TOOLS
Filed Sept. 9, 1955 2 Sheets-Sheet 2

Inventor
Alois Moosmann
By Gustav H. Emery
Atty.

United States Patent Office 2,899,031
Patented Aug. 11, 1959

2,899,031

PNEUMATIC GEAR-SHIFT ARRANGEMENTS FOR TOOTHED WHEEL CHANGE-SPEED GEARS, ESPECIALLY FOR MACHINE TOOLS

Alois Moosmann, Stuttgart-Birkach, Germany

Application September 9, 1955, Serial No. 533,376

Claims priority, application Germany September 13, 1954

6 Claims. (Cl. 192—18)

The invention relates to a pneumatic gear-shift arrangement for toothed wheel change-speed gears, which is intended more especially but not exclusively for machine tools.

The result of increasing automatic control of machine tools is that also the speeds of the main drive of such machines can be changed automatically by a program controller system. For this purpose, there are mainly employed electromagnetic clutches, which are always disposed between two speed stages adjacent the gear wheels. In this case, a large number of electromagnetic clutches are necessary with a gear having many speed ratios. Electromagnetic clutches of this type have the disadvantage, however, that despite their modern compact construction, they require a considerably larger amount of space than mechanical clutch-coupling sleeves or claw-type sleeves. They require considerably larger axial spacings and thus larger gear wheels, this resulting in considerably larger dimensions for the complete gear, particularly with large outputs. The cost of manufacturing such gears obviously increases with the dimensions.

The invention has for its object to provide a pneumatic gear-changing arrangement for toothed wheel change-speed gears, more especially for machine tools, which permits a fully automatic changing of a normal mechanical gear with claw-type sleeve as coupling element and with the clutch and brake elements mounted in the usual manner ahead of the change-speed gear.

Consequently, the invention is concerned with a pneumatic shifting arrangement for toothed wheel change-speed gears, with which alternatively a friction clutch or a friction brake is actuated by compressed air. This pneumatic shifting arrangement is connected in series with the gear.

The invention consists essentially in that a diaphragm, a piston or other form of movable partition is provided in the pneumatic controller between two compressed air chambers to which are suitably connected the compressed air lines leading to the friction clutch and the friction brake, respectively, the said partition having for its object to obstruct the freshly supplied air from entering and thus becoming operative until the air pressure on the other side of the pneumatic controller has dropped to such a value that the force effect produced by it on one of the gear elements (clutch or brake) has weakened, i.e. has become inoperative.

According to one particularly simple embodiment of the invention, the movable partition, particularly the diaphragm, is arranged in a chamber into which the compressed air lines open through bores which are alternatively closed by the diaphragm itself under the action of the air pressure acting on the opposite surface of the diaphragm. The total pressure surface of the diaphragm is preferably a multiple of that opening cross-section of the opposite compressed air line which is to be closed.

In a further development of the invention, regulating and control members are provided, these being more fully explained hereinafter.

A pneumatic shifting arrangement according to the invention is advantageously used in combination with a program controller by which the operating cycle of the machine, more especially of the machine tool, is controlled pneumatically in accordance with a predetermined program. Such a program controller is the subject of my co-pending application Serial No. 533,375.

One embodiment of the invention is illustrated by way of example in the drawing, wherein.

Figure 1:
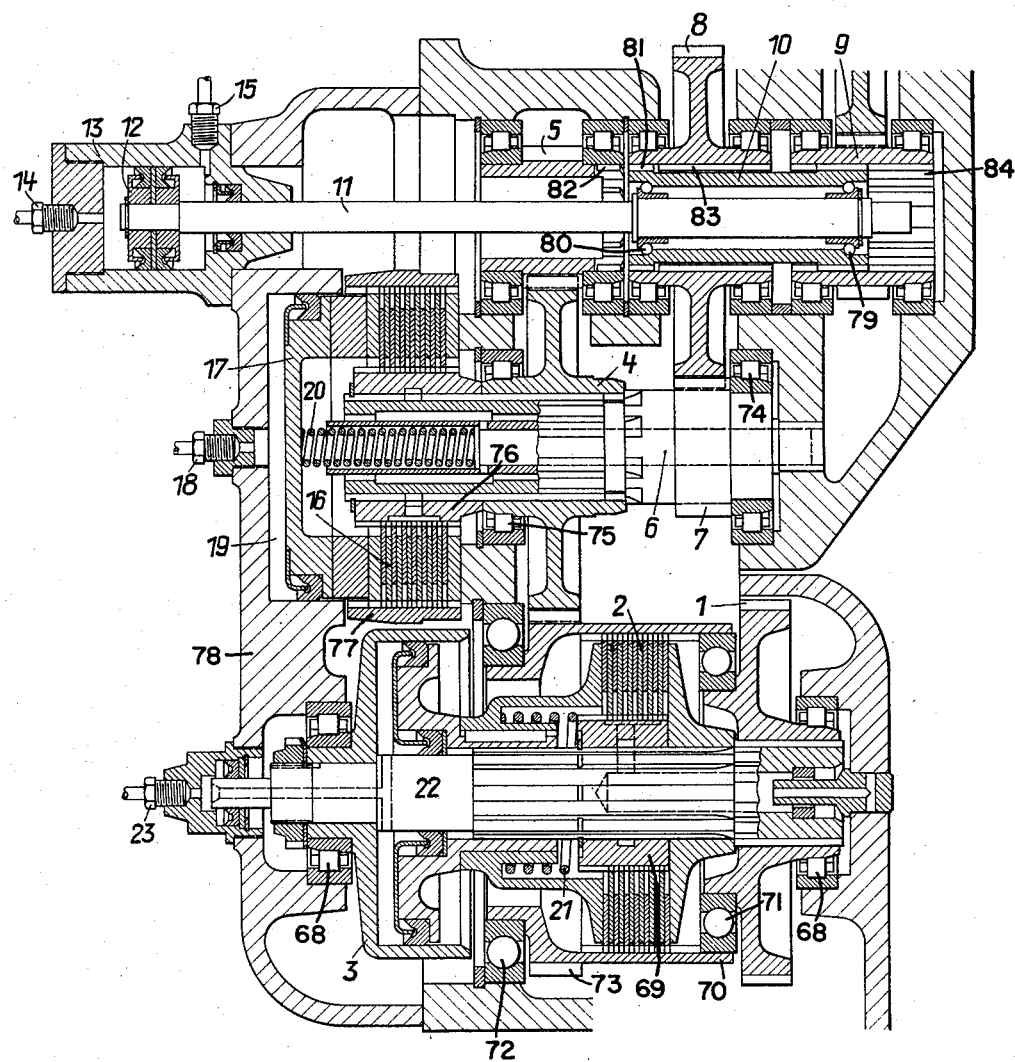
Figure 1 is a longitudinal section of a toothed wheel charge-speed gear with a clutch and brake, for example, for driving a machine tool.

In the constructional example illustrated in the drawing, the gear has a gearshift sleeve for changing the speed. It is obvious that as many of such sleeves as desired may be arranged in series in order accordingly to form a multi-stage gear. By means of a multiple-disc clutch 2, which is actuated by a piston in a compressed air cylinder 3, a driving gear 1 drives a gear wheel 4 or, through a shaft 6 with a gear wheel 7, to a gear wheel 5 or, through a shaft 6 with a gear wheel 7, to a gear wheel 8. Owing to the different diameters of the wheels 4, 5, 7 and 8, the wheels 5 and 8 rotate at different speeds.

A gear wheel 9 is connected by a gearshift sleeve 10 either to the gear 5 or to the gear 8 and is thereby given the different speeds of the two gears. The claws 81 of the sleeve 10 engage in corresponding counteracting claws 82 and 83, respectively, in the bores of the two toothed wheels 5 and 8. The driving of the wheel 9 by the sleeve 10 is effected by a splined profile 84, in which the sleeve 10 is mounted for axial displacement. The displacement of the sleeve 10 is effected through a shift shaft 11 by a pressure piston 12. The latter slides in a cylinder 13 into a right-hand or left-hand end position, according to whether compressed air is admitted through a connection 14 or a connection 15.

Provided on the shaft 6 is a disc brake 16, which is rendered operative by a compressed air piston 17 as soon as compressed air passes through a connection 18 into the cylinder space 19. A relatively strong spring 20 forces the compressed air piston 17 back when the action of the compressed air subsides, and releases the brake discs.

The driving clutch 2 is released by a spring 21 in the same manner when the action of the compressed air in the cylinder 3 subsides. The compressed air cylinder 3 is supplied with compressed air through the interior of a shaft 22 and a connection 23.

The driving gear 1 is fixed on the shaft 22 mounted in roller bearings 68. On the shaft 22 is secured an inner clutch body 69. The outer coupling body 70 is rotatably mounted in two ball bearings 71 and 72. The body 70 carries a gear wheel 73 meshing with the gear wheel 4 which is fixed on the shaft 6. The shaft 6 is rotatably mounted in roller bearings 74 and 75. On the shaft 6 is fixed an inner brake body 76. The outer brake body 77 is secured to the casing 78. The sleeve 10 is mounted on ball bearings 79 and 80.

Figure 2:
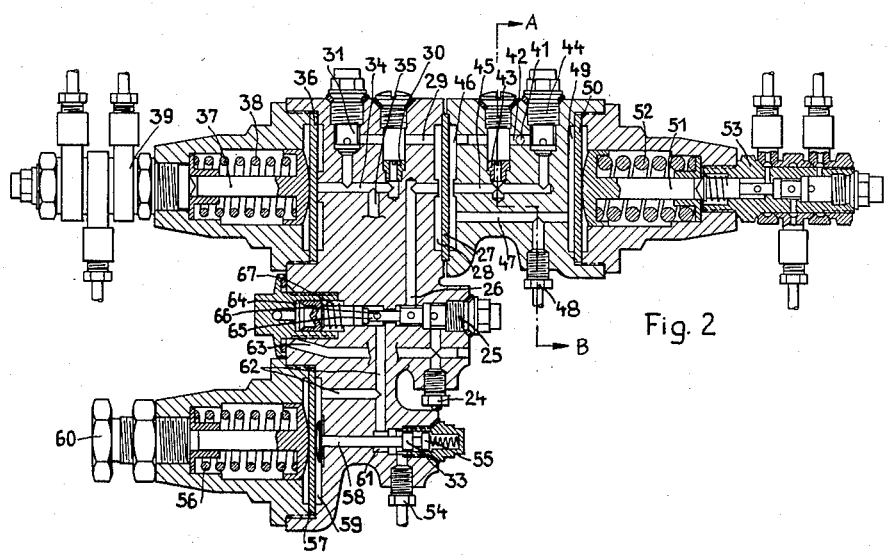
Figure 2 is a longitudinal section of the pneumatic shifting arrangement proper.
Figure 4:
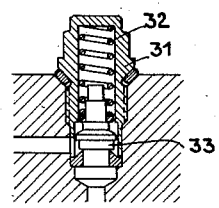
Figure 4 is a cross-sectional view to a larger scale through the non-return valve according to Figure 2.
Figure 3:
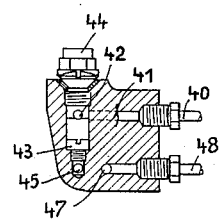
Figure 3 is a cross-section on the line A—B of Figure 2.

The actual pneumatic shift device shown in Figure 2 is functionally connected ahead of the gear according to Figure 1. If this gear is to be set in rotation from the stationary position, compressed air is admitted, for example, from a program controller and through a connection 24 into the said device and first of all passes a change-over valve 25, the purpose of which is later described, and passes through a bore 26 into a chamber 28 containing a diaphragm 27. From the said chamber, the air flows forward through a bore 29 to a nozzle 30, and also through the continuation of the bore 29 into the chamber of a non-return valve 31. The non-return valve 31 (Figure 4) is closed by a spring 32 against the continued flow of the compressed air in the admission direction by means of a valve plate 33, so that further flow of the air is only possible by way of the nozzle 30 into the bores 34 and 35. The bore 35 communicates by way of a pipe line with the connection or union 23 of the gear in Figure 1. The air slowly transmitted by the nozzle 30 thus slowly fills the space of the compressed air cylinder 3 through the bore 35 and the connecting pipe leading to the union 23. By this means, a pressure is slowly built up in the cylinder 3. The force of the spring 21 is finally overcome and the clutch brought into frictional engagement. The gear is gently started. The gentleness of the starting can be regulated as desired by adjusting the nozzle 30.

The building up of pressure behind the nozzle 30 also acts on a diaphragm 36, which in turn actuates an impulse-emitting valve 39 through a plunger 37 against the action of a spring 38. The valve 39 transmits the signal concerning the completed coupling operation to a pneumatically operating program selector, which is not shown in detail in the drawing, and advances the program by one step. The machine operates.

If the machine or the gear is to be braked to a standstill from this operating condition, the union 24 is connected by the program controller to atmospheric air, that is to say, it is vented, and at the same time compressed air is supplied to a union 40. The latter leads through bores 41 and 42 into the chamber of a nozzle 43 and into the chamber of a non-return valve 44, which is constructed in the same way as the non-return valve 31. In this case as well, the valve 44 shuts off the air which is entering, so that this air can only be transmitted through the nozzle 43. The air slowly transmitted by the nozzle 43 first of all fills the bore 45 and would then pass in the direction of the diaphragm 27 into a chamber 46. As long as an appreciable pressure is still obtaining on the clutch side in the chamber 28, and therefore as long as the clutch is still not completely released, however, the diaphragm does not allow this to happen, because it is urged with the pressure of the entire surface of the chamber 28 against the bore 45 and thus closes the latter. It is only when the pressure in the chamber 28 is reduced to such a degree that the pressure of the air in the bore 45 with its small area is greater in comparison with the pressure of the chamber 28 with its large area that the diaphragm opens the outlet from the bore 45, and the air passes into the chamber 46 and flows forward through a bore 47 and into a union 48 to the union 18 of the braking cylinder 19 of the brake 16, slowly filling the space in this cylinder. Finally, the force of the compressed air on the piston 17 exceeds the force of the spring 20 and brings the discs of the brake 16 into frictional engagement, so that the gear is braked.

With the pressure in the space of the cylinder 19, pressure is also built up through the extended bore 47 in a chamber 49, where this pressure acts on a diaphragm 50. The latter in turn presses against a plunger 51 against the action of a spring 52. With increasing pressure, the force of the spring 52 is overcome. The plunger 51 actuates an impulse-emitting valve 53. This valve 53 gives the signal to the program controller that the braking is completed and at the same time the impulse for an advancing step of the program controller. The program controller can now either leave the machine in the stationary position, if this is required, or it can produce a change in speed, if the program of the machine provides for this.

With the change in speed, the program controller, due to the step forward initiated by the valve 53, at the same time frees the unions 40, 41 for venting purposes, applies pressure to the union 24 for the clutch operation, and vents one of the two pipes 14 or 15, so that compressed air is admitted to one or other side of the piston 12. The build-up of pressure in the cylinder 13 through the pipe 14 or 15 takes place very quickly, while the reduction of the pressure in the braking cylinder 19 is completed slowly by the nozzle 43.

According to the dimensions of the spring 32, it is possible by means of the non-return valve 44 for the reduction in pressure down to any desired value to take place quickly. However, as soon as the spring 32 closes the valve plate 33, the air in the braking cylinder can only still escape correspondingly slowly through the nozzle 43, until finally the pressure in the chamber 46 is so small that the pressure of the air stream until then maintained in the bore 26 overcomes the small pressure on the large area of the chamber 46 after it has been almost completely emptied and flows into the chamber 28. By this means, the coupling process is repeated, in the manner which has already been described.

During the slow relaxation of the pressure in the braking cylinder 19, the shift piston 12 has displaced the sleeve 10 into the new coupling position through the shift rod 11, or if there is tooth to tooth engagement, has caused the said sleeve to bear against the counteracting wheel in such manner that it immediately comes into engagement with the slow commencement of the turning movement owing to the spring action of the compressed air through the clutch 2.

It is also to be noted that the non-return valve 31 can be set in exactly the same way as described in connection with the valve 44, so that a more rapid relaxing of the pressure is achieved on the clutch side. It is merely necessary for the spring 32 to be suitably designed.

In practical machine construction, it is a fact that the full power of a drive means is only used at relatively high speeds. At the lower speeds, the torque, which is very high at full capacity, is frequently not required. Consequently, the dimensions of the gear wheel can be based on a torque which is smaller than the full driving capacity. In order that this part of the gear, which can only be subjected to a reduced load, is protected against breakage with the nevertheless still possible overloading, it is proposed according to a further development of the invention to provide a device which becomes operative at the instant at which the gearshift sleeves of that part of the gear which can only be subjected to a reduced load are shifted to the transmission position. In this case, by means of a special change-over valve which is not more fully described herein, the coupling air is supplied to the device through a connection 54 instead of through the connection 24. The air thereby passes to a pressure-reducing valve 55, which is left open by a spring 56 acting through a diaphragm on a plunger 58 until the pressure in the chamber 59 overcomes the action of the spring 56. The force of the spring 56 is adjustable by a screw 60. The connection between the pressure-reducing valve 55 and a chamber 61, and also the bores 62, is broken as soon as the plunger 58 has yielded so far in the direction towards the spring 56 that the valve plate 33 has come to rest. A reduced pressure is therefore obtaining in the chamber 59 and in the bores 62, which pressure is determined by the spring 56. The bore 62 allows the air at reduced pressure to pass into the bore 26 through the change-over valve 25, which is open in this case, and the device is capable of functioning in the same way as previously described.

The multiple-disc clutch, however, only transmits a small torque corresponding to the reduced pressure and thus protects the gear against damage or breakage due to overloading. If the full torque is to be transmitted again, the connection 24 is again supplied with air and the valve 25 is automatically changed over by the fact that air passes through a bore 63 into a cylinder space 64 and forces a valve stem 65 against the valve plate 33, whereby a bore 66 is closed, and with continued forward pressure of the valve stem 65, the valve plate 33 is lifted, so that the connection 24 is brought into communication with the bore 26 beyond the valve plate 33. If the pressure in the connection 24 and thus in the bore 63 fails, the valve stem 65 is shifted to its initial position again by the action of a spring 67 and the bore 62 is brought into communication with the bore 26.

I claim:

1. Pneumatic gear shift device for change-speed gears, particularly for machine tools, comprising a friction clutch and a friction brake adapted to be alternatively actuated by compressed air, two compressed air chambers connected by means of compressed air lines to said friction clutch and said friction brake respectively, a movable partition separating the two compressed air chambers, a piston arranged in a chamber and dividing said chamber into two compressed air chambers, said compressed air lines opening into said compressed air chambers from both sides opposite to said movable partition through bores adapted to be closed by said movable partition alternatively under the action of the air pressure acting on the opposed surfaces of said partition, said movable partition being adapted to obstruct the freshly supplied air at the inlet and thereby delaying its effect until the air pressure on the other side of the shift device has fallen to such a value that the force effect produced thereby has become ineffective on one of said friction elements.

2. Pneumatic device according to claim 1, in which the total pressure surface of said partition is a multiple of the opening cross-section of the compressed air lines to be closed by said partition.

3. Pneumatic device according to claim 1, in which a throttling member is arranged in the compressed air lines leading to the friction clutch and the friction brake, respectively, said throttling member being adapted to retard the building-up of the pressure and thus the operating speed of said clutch and said brake, respectively.

4. Pneumatic device according to claim 1, in which the pressure chambers of said friction clutch and said friction brake are connected to pressure chambers having diaphragms, said diaphragms acting on impulse-emitting valves, said impulse-emitting valves being connected to a program controller, each impulse causing a step motion of said program controller as soon as the pressure being built up in said pressure chambers has reached a certain level.

5. Pneumatic device according to claim 1, in which a change-over valve is arranged in said compressed air line directing the compressed air causing the coupling process to said compressed air chamber connected to said friction brake, said change-over valve being adapted to connect said compressed air line to a full pressure air line and to a reduced pressure air line, respectively.

6. Pneumatic device according to claim 5, in which a pressure-reducing valve is fitted in said reduced pressure air line.

References Cited in the file of this patent

UNITED STATES PATENTS

| | | |
|---|---|---|
| 1,979,488 | Perez | Nov. 6, 1934 |
| 2,050,245 | Carter | Aug. 11, 1936 |
| 2,703,162 | Keim et al. | Mar. 1, 1955 |
| 2,706,026 | Georgeff | Apr. 12, 1955 |
| 2,785,781 | Johansen | Mar. 19, 1957 |